United States Patent [19]

Smale

[11] Patent Number: 5,562,568
[45] Date of Patent: Oct. 8, 1996

[54] BRAKE-TRANSMISSION-IGNITION KEY INTERLOCK SYSTEM

[75] Inventor: Randall D. Smale, Farmington Hills, Mich.

[73] Assignee: Dura Mechanical Components, Inc., Troy, Mich.

[21] Appl. No.: 292,251

[22] Filed: Aug. 18, 1994

[51] Int. Cl.$^6$ .......................... B60K 41/28; B60K 41/04; B60K 41/26
[52] U.S. Cl. .................. 477/99; 192/4 A; 477/96
[58] Field of Search ............... 192/4 A; 477/96, 477/99

[56] References Cited

U.S. PATENT DOCUMENTS

| | | | |
|---|---|---|---|
| 4,880,092 | 11/1989 | Kito et al. | 477/99 X |
| 5,009,295 | 4/1991 | Kinkade et al. | 477/99 X |
| 5,018,610 | 5/1991 | Rolinski et al. | 74/483 R |
| 5,062,509 | 11/1991 | Carpenter et al. | 74/483 R |
| 5,096,033 | 3/1992 | Osborn | 74/878 |
| 5,211,271 | 5/1993 | Osborn et al. | 192/4 A |

*Primary Examiner*—Rodney H. Bonck
*Attorney, Agent, or Firm*—David A. Greenlee

[57] ABSTRACT

A vehicle brake-transmission-ignition interlock system includes a bi-stable solenoid operable to lock and unlock the shift lever in PARK position. Another bi-stable solenoid is operable to block and unblock ignition key movement to OFF position for removal. A controller is responsive to high and low input signals to operate both solenoids. An electric circuit connects to the controller and includes a brake switch closed and opened by applying and releasing the service brake and a parallel shift lever switch opened and closed by movement of the shift lever into and out of PARK position. An ignition switch in series with the brake switch is opened by key movement to OFF position and is closed by key movement to ACCESSORY and RUN positions. Another ignition switch in series with the shift lever switch is opened by key movement to OFF and ACCESSORY positions and is closed by key movement to RUN position. Moving the shift lever to PARK and releasing the service brake opens the brake and shift lever switches to provide a low input signal to the controller which operates the solenoids to lock the shift lever and unblock key movement to OFF position, enabling key removal. Key insertion and movement to RUN position and brake application supplies a high input signal to the controller which operates the solenoids to unlock the shift lever and block key movement to OFF position.

13 Claims, 4 Drawing Sheets

| CYLINDER POSITION | IGN 1 | IGN 2 |
|---|---|---|
| OFF LOCKED | O | X |
| ACC | O | X |
| RUN | X | X |
| CRANK | X | X |
42,142 — IGN 1; 44,144 — IGN 2
FIG 3
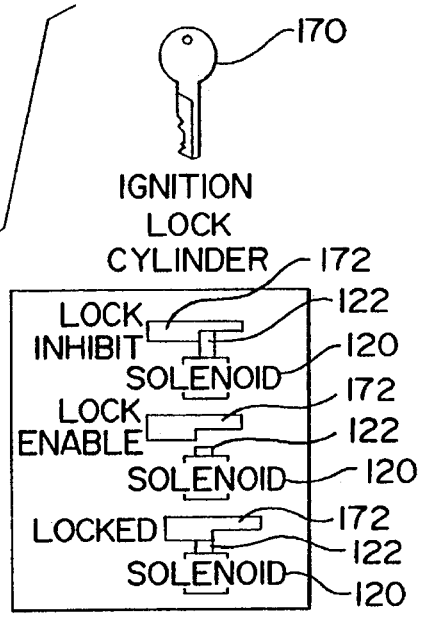
FIG 4
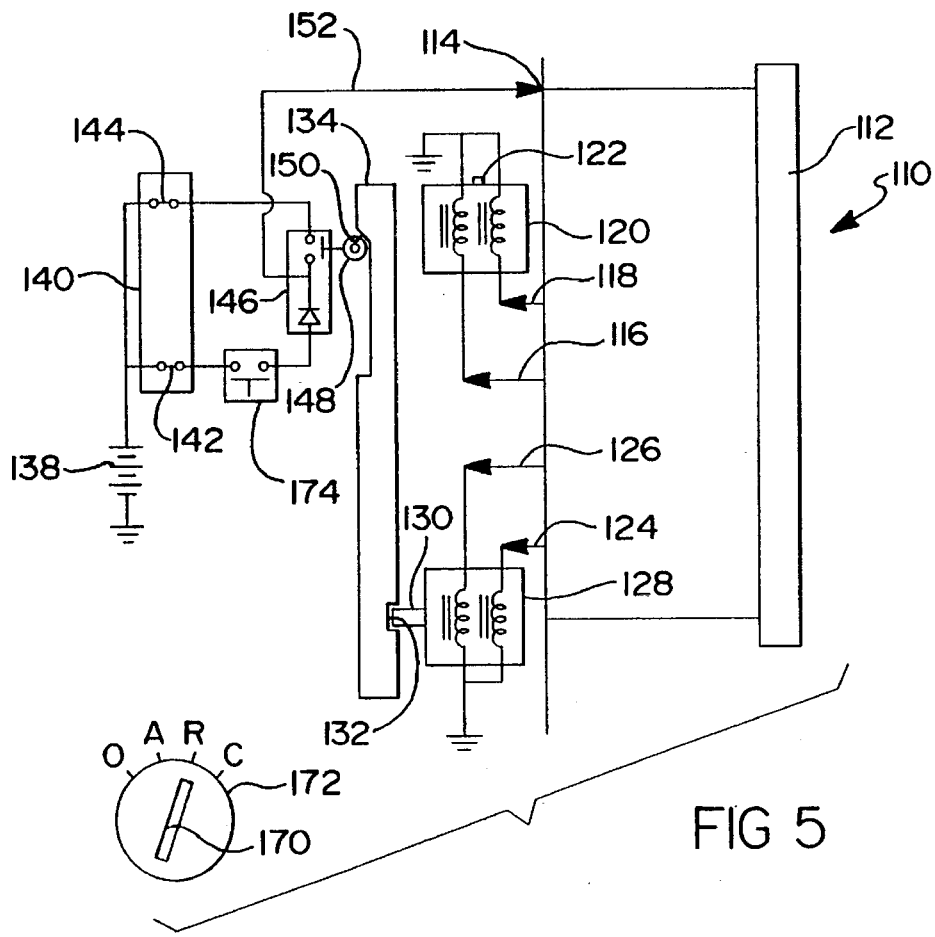
FIG 5

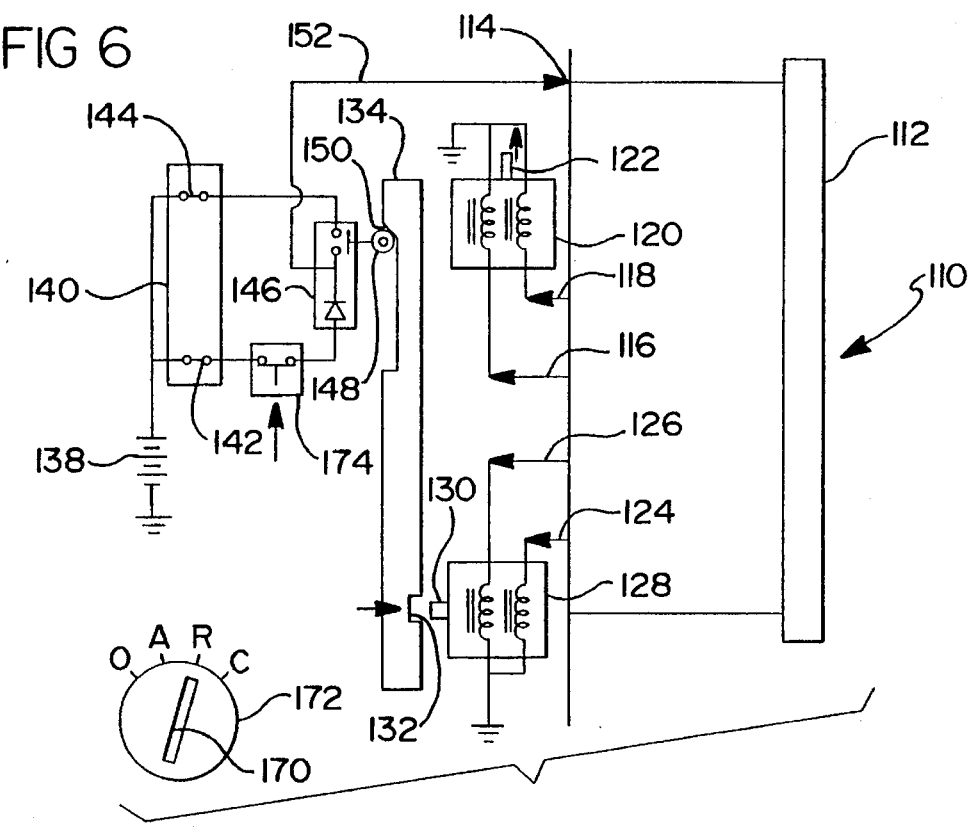
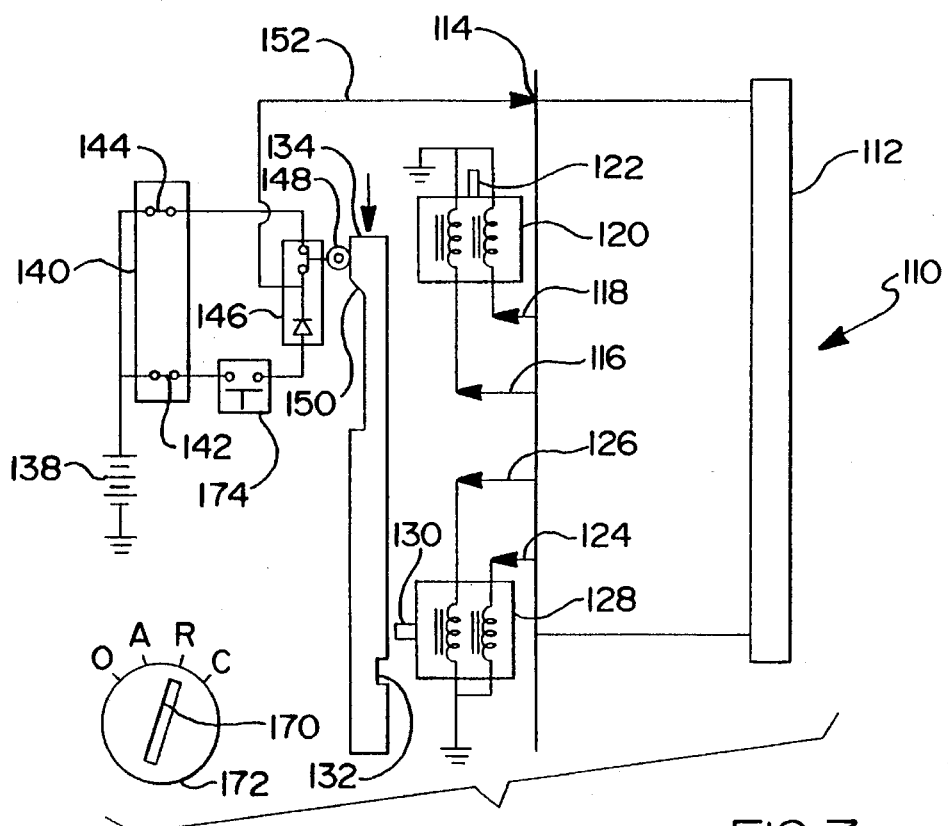

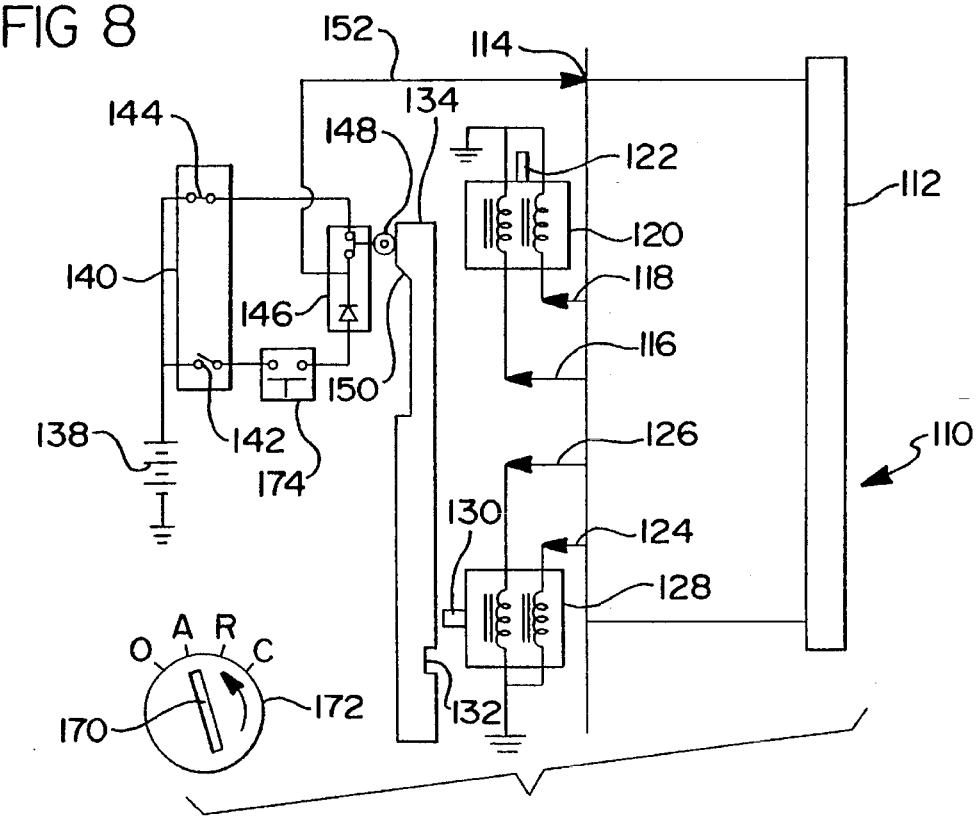

5,562,568

BRAKE-TRANSMISSION-IGNITION KEY INTERLOCK SYSTEM

BACKGROUND OF THE INVENTION

This invention relates generally to control systems for locking an automatic shift lever in PARK position unless the ignition is in RUN position and the service brake is applied, and, more particularly, to such a system in which the ignition key cannot be removed unless the shift lever is in PARK position.

Many systems have been devised to lock a vehicle's automatic transmission shifter in PARK position unless and until the vehicle's service brake is applied. This is a safety device that assures that the vehicle cannot be inadvertently placed in motion. These are referred to as BTSI (Brake-Transmission Shifter Interlock) systems. BTSI systems usually provide a latch which is automatically operated, via spring bias or cam means, upon movement of the shifter to PARK position, to block operation of the shifter detent, thus blocking shifter movement. Closure of the brake switch by applying the brakes operates a solenoid to retract or disable this latch and enable movement of the lever out of PARK to an operating position. Such a system is shown in U.S. Pat. No. 5,062,509—Carpenter.

Many other systems have been devised which prevent movement of the vehicle ignition key to OFF position for removal unless the vehicle's automatic transmission shifter is in PARK position and locks the shifter in PARK until the key is inserted and moved to RUN position. Some vehicles utilize this shifter-ignition interlock system in combination with a BTSI system. Such a combination is illustrated in FIG. 1 of the drawings which illustrates a system developed by General Motors Corporation (GM). This system is used in a vehicle having an ignition moveable among OFF, ACCESSORY, RUN and CRANK positions, a brake pedal movable between APPLIED and RELEASED positions, and a transmission control lever movable among PARK and a plurality of RUN positions.

FIG. 1 illustrates a combination BTSI and shift lever/ignition lock system 10 which includes a controller 12, termed a "PZM" by GM, which includes a microprocessor. Controller 12 responds to signals supplied to an input 14 to provide outputs 16 and 18 to control operation of a bistable ignition lock solenoid 20, having an armature 22, and outputs 24 and 26 of bi-stable shift lever pushbutton solenoid 28, having an armature 30.

Solenoid 20 responds to controller outputs 16 and 18 to extend and retract armature 22. When extended, armature 22 blocks movement of an ignition key (described later with respect to the invention) to OFF position, thus preventing key removal from its ignition lock cylinder. Similarly, solenoid 28 responds to controller outputs 24 and 26 to retract and extend armature 30. When extended, armature 30 engages a locking notch 32 of a pushbutton 34 which is carried by the usual automatic transmission shift lever (not shown) to operate a detente rod which cooperates with a detente plate to locate the lever in PARK and other positions, as shown in the aforementioned Carpenter patent.

A control circuit 36 provides "high" and "low" signals to input 14 of controller 12. When a low signal is provided, controller 12 activates outputs 18 and 26 to retract armature 22 and extend armature 30. This unblocks ignition key movement to OFF, enabling removal, and locks pushbutton 34, which locks the vehicle transmission in PARK.

Circuit 36 includes a power source 38, such as the vehicle battery, and the vehicle ignition 40 which includes first and second switches 42 and 44 that are located in parallel branch circuits. Ignition switch 44 is connected in series with a pushbutton control switch 46 that is normally open and is closed by a follower 48 operated by cam surface 50 on shift lever pushbutton 34. Switch 42 connects with controller input 14 by conductor 52.

Ignition switch 42 connects to a BTSI solenoid 54 through a control switch 56, which is closed when the shift lever is in PARK, and another control switch 58 that is normally closed when the vehicle service brakes are released. Solenoid 54 is not bi-stable and is spring biased to project armature 60 into another locking notch 62 in pushbutton 34.

As can be seen by FIG. 1, if all of switches 42, 56 and 58 are closed (ignition in RUN, shift lever in PARK, and brake released), solenoid 54 will be actuated to extend armature 60 to locking position, preventing movement of the shift lever out of PARK. However, if any of switches 42, 56 and 58 are open (i.e. ignition in OFF, or shift lever out of PARK, or brake applied), the circuit will be opened, deactuating solenoid 54, enabling spring retraction of armature 60. With the ignition in RUN, the brake must be applied to enable retraction of armature 60. This is the BTSI function.

Ignition switch 44 is open in OFF and ACCESSORY positions, while switch 42 is closed only in OFF position. The ignition/shifter interlock as shown in FIG. 1 is responding to a "low" input signal to controller 12, with the ignition key in OFF and the shifter lever in PARK. Insertion of the key and movement to RUN will close both switches 42 and 44, providing a "high" signal to controller 12 through switch 42. This retracts armature 30, freeing the shift lever for movement out of PARK only if the service brake is also applied to open switch 58 and retract armature 60.

It would be desirable to simplify this circuit, while providing both the BTSI and the ignition/transmission lever interlock functions.

SUMMARY OF THE INVENTION

It is therefore an object of this invention to provide a control circuit which provides both the BTSI and the ignition/transmission interlock functions.

In one aspect, this invention features a brake-transmission-ignition interlock system for a vehicle having an automatic transmission controlled by a shift lever movable among PARK and a plurality of other operative positions, a service brake, a power source, and an ignition controlled by an ignition key which is movable between OFF and RUN positions. The system comprises a first electrical device movable between positions locking and unlocking the shift lever in PARK position, a second electrical device movable between positions blocking and unblocking movement of the ignition key to OFF position, and a controller having an input and having outputs connected to both electrical devices. The controller is responsive to first and second input signals for operating both electrical devices together. An electric circuit connects the power source with the controller input and has a first control switch, actuated and deactuated by applying and releasing the service brake, and a second control switch in parallel with the first switch, actuated and deactuated by movement of the shift lever into and out of PARK position. A first ignition switch in the circuit in series with the first control switch is operated between actuated and deactuated positions upon movement of the ignition key between OFF and RUN positions. A second ignition switch in the circuit in series with the second control switch is operated between actuated and deactuated positions upon movement of the ignition key between OFF and RUN positions. Movement of the shift lever to PARK position and release of the service brake deactuates the first and second control switches and causes the controller to operate the first electrical device to lock the shift lever and to operate the second electrical device to unblock movement of the ignition key to OFF position. Movement of the ignition key to RUN position actuates the first ignition switch, and applying the brakes actuates the first control switch to provide the first input signal to the controller to operate the first electrical device to unlocking position to enable movement of the shift lever out of PARK position.

Preferably, the first and second electrical devices are first and second bi-stable solenoids.

In another aspect, this invention features a brake-transmission-ignition interlock system comprising a first bi-stable solenoid movable between positions locking and unlocking the shift lever in PARK position, a second bi-stable solenoid movable between positions blocking and unblocking movement of the ignition key to OFF position, a controller having an input and having outputs connected to both solenoids which is responsive to high and low input signals for operating both solenoids together, and an electric circuit connecting the power source with the controller input. A first control switch in the circuit is closed and opened by applying and releasing the service brake, and a second control switch in the circuit in parallel with the first switch is opened and closed by movement of the shift lever into and out of PARK position. A first ignition switch in the circuit in series with the first control switch is opened by movement of the ignition key to OFF position and is closed by movement of the ignition key to ACCESSORY and RUN positions, and a second ignition switch in the circuit in series with the second control switch is opened by movement of the ignition key to OFF and ACCESSORY positions and is closed by movement of the ignition key to RUN position. Closing of either circuit branch provides a high input signal to the controller which operates the first solenoid to unlocking position and operates the second solenoid to blocking position, while opening of both circuit branches provides a low input signal to the controller which operates the first solenoid to locking position and operates the second solenoid to unblocking position. Movement of the shift lever to PARK position and release of the service brake opens the first and second control switches to provide a low input signal to the controller, and movement of the ignition key to RUN position closes the first ignition switch and applying the service brake closes the first control switch to provide a high input signal to the controller.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 3 is a chart of operation of ignition switches included in the system of FIG. 2;

FIG. 4 is a diagram of operation of an ignition key removal blocking solenoid included in the system of FIG. 2;

FIG. 5 is a diagram similar to that of FIG. 2, illustrated with the shift lever in PARK, the brake released, and the ignition key in RUN;

FIG. 6 is a diagram similar to that of FIG. 2, illustrated with the shift lever in PARK, the brake applied, and the ignition key in RUN.

FIG. 7 is a diagram similar to that of FIG. 2, illustrated with the shift lever out of PARK, the brake released, and the ignition key in RUN;

FIG. 8 is a diagram similar to that of FIG. 2, illustrated with the shift lever out of PARK, the brake released, and the ignition key in ACCESSORY; and FIG. 9 is a diagram similar to that of FIG. 2, illustrated with the shift lever in PARK, the brake released, and the ignition key in ACCESSORY.

DETAILED DESCRIPTION OF A PREFERRED EMBODIMENT

Figure 1:
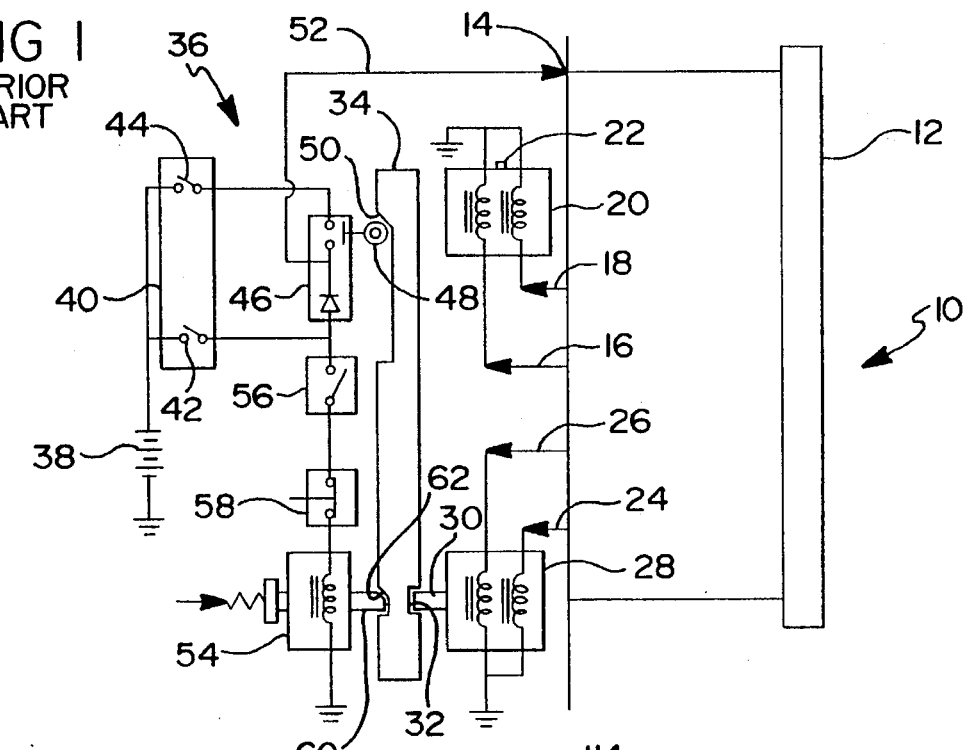
FIG. 1 is a schematic diagram of a prior art BTSI and transmission-ignition interlock systems.

FIGS. 2 and 5–9 illustrate a brake-transmission-ignition interlock system 110 according to this invention. System 110 is essentially a simplification of the prior art system 10 shown in FIG. 1, and elements which are identical or similar to those in FIG. 1 are identified by the same reference numeral increased by 100. Thus, controller 112 in FIGS. 2 and 5–9 is the same as controller 12 in FIG. 1.

Controller 112 responds to input 114 to control operation of bi-stable solenoid 120 armature 122, via outputs 116 and 118, and control extension and retraction of armature 130 of bi-stable solenoid 128, via outputs 124 and 126. Extension and retraction of armature 122 of solenoid 120 is also controlled by controller outputs 116 and 118.

An ignition key 170 is insertable in an ignition cylinder 172 for rotation among OFF (O), ACCESSORY (A), RUN (R), and CRANK (C) positions. Movement of key 170 among these positions operates switches 142 (IGN 1) and 144 (IGN 2) between open (O) and closed (X) positions, as indicated in FIG. 3.

FIG. 4 is a diagram which illustrates the operation of solenoid 120 between LOCK INHIBIT and LOCK ENABLE positions. Extension of armature 122 (to LOCK INHIBIT) blocks movement of ignition key 170 beyond ACCESSORY to OFF position, thus preventing key removal from ignition cylinder 172. Retraction of key 170 (to LOCK ENABLE) permits movement of key 170 to OFF for removal from cylinder 172.

Shift lever pushbutton 134 is in the FIG. 2, 5, 6 and 9 position when the shift lever is in PARK, as is well-known. Extension of armature 130 into locking notch 132 locks pushbutton 134 in PARK. Pushbutton 134 must be depressed to the FIGS. 7 and 8 position to move the lever out of PARK; this requires retraction of armature 130.

When circuit 136 provides a "low" signal to controller 112, output 118 commands armature 122 to retract, unblocking movement of ignition key 170 to OFF. Controller output 126 commands armature 130 to extend, locking pushbutton 34 in PARK. Conversely, when circuit 136 provides a "high" signal to controller 112, output 116 commands extension of solenoid armature 122 to block ignition key removal. Controller output 124 causes retraction of solenoid armature 130 to release pushbutton 134 and unlock the shift lever for movement out of PARK.

Control circuit 136 differs from circuit 36 in that solenoid 54 and switch 56 are eliminated and brake pedal switch 58 is replaced by switch 174, which is normally open when the brakes are released and is closed by brake application. The previous BTSI solenoid 54 is eliminated. The function of the BTSI solenoid is accomplished by shift lever pushbutton solenoid 128, under the control of brake switch 174.

Figure 2:
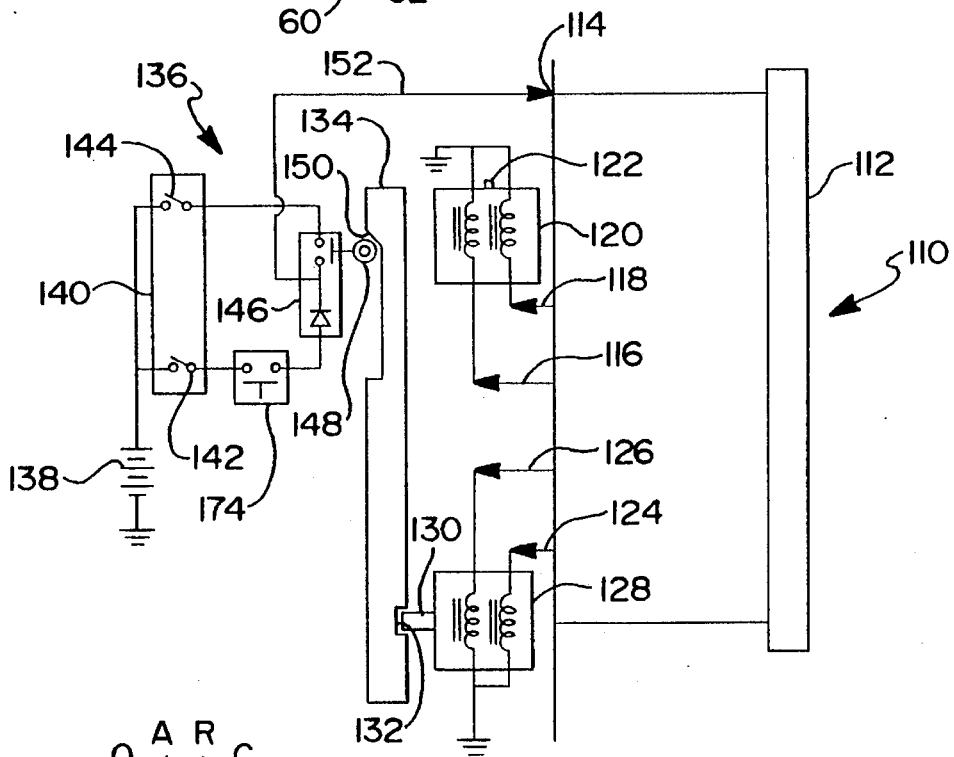
FIG. 2 is a schematic diagram of a combined brake-transmission-ignition interlock system according to this invention, illustrated with shift lever in PARK, the brake released, and the ignition key in OFF.
Figure 2:
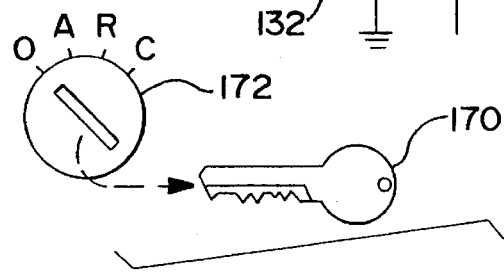

The operation of brake-transmission-ignition interlock system 110 is as follows. FIG. 2 illustrates the system when the vehicle is parked. The shift lever is in PARK and ignition cylinder 172 is OFF, with key 170 removed, opening ignition switches 142 and 144 (see FIG. 3). This isolates power source 138 and causes control circuit 136 to send a "low" input signal to controller 112, which retracts solenoid armature 122 to enable key 170 removal. Controller 112 also extends solenoid armature 130 to lock pushbutton 134. The vehicle brakes are released which opens brake switch 174. Thus, unless either of switch pairs 142 and 174 or 144 and 146 are closed, solenoid armature 130 will remain extended to lock pushbutton 134 and the shift lever in PARK.

When it is desired to drive the vehicle, key 170 is inserted into ignition cylinder 172 and rotated to CRANK, to start the vehicle engine, and then to RUN, as shown in FIG. 5. This closes both ignition switches 142 and 144 (see FIG. 3). However, since both switches 174 and 146 remain open, power source 138 remains isolated and control circuit 136 continues to send a "low" signal to controller 112. Solenoid armature 130 remains extended and solenoid armature 122 remains retracted, as shown.

FIG. 6 shows the effect of applying the vehicle brakes, which closes brake pedal switch 174. This connects control circuit 136 to power source 138 through closed switches 142 and 174, sending a "high" input signal to controller 112. This causes solenoid armature 122 to extend, locking key 170 in cylinder 172, and causes solenoid armature 130 to retract, freeing pushbutton 134.

When pushbutton 134 is depressed, as illustrated in FIG. 7, the shift lever can now be moved from PARK to a RUN position. Subsequent release of the vehicle brakes enables the vehicle to be driven. Although brake release opens switch 174, depression of pushbutton closes switch 148, as shown. As a result, control circuit 136 remains connected to power source 138, through closed switches 144 and 148. This maintains a "high" input signal to controller 112, maintaining extension of solenoid armature 122 and retraction of solenoid armature 130, which enables the Vehicle to be normally driven.

When it is desired to park the vehicle, it is stopped and ignition key 170 is rotated to ACCESSORY position, as shown in FIG. 8. This opens switch 142, thereby making the position of brake pedal switch 174 irrelevant. Since switches 144 and 148 remain closed, the position of solenoid armature 122 remains extended as before. This blocks movement of key 170 to LOCKED position and prevents key removal.

To remove key 170 from cylinder 172, shift lever must be moved to PARK and pushbutton 134 released, as shown in FIG. 9. This action opens switch 148, thus isolating power source 138 again. Control circuit 136 then changes the input signal to controller 112 to "low" which causes solenoid armature 130 to extend, locking pushbutton 134, which locks the shift lever in PARK. The "low" input signal to controller 112 also causes solenoid armature 122 to retract, thus enabling rotation of ignition key 170 to the LOCKED position of FIG. 2.

Thus, this invention provides a control circuit which provides both the BTSI and the ignition/transmission interlock functions of the prior art, but which eliminates the BTSI solenoid, thereby reducing the number of required parts and simplifying the circuit. While only a preferred embodiment has been illustrated and described, obvious modifications thereof are contemplated within the scope of this invention and the following claims.

We claim:

1. A brake-transmission-ignition interlock system for a vehicle having an automatic transmission controlled by a shift lever movable among PARK and a plurality of other operative positions, a service brake, a power source, and an ignition controlled by an ignition key which is movable between OFF and RUN positions, comprising a first electrical device movable between positions locking and unlocking the shift lever in PARK position, a second electrical device movable between positions blocking and unblocking movement of the ignition key to OFF position, a controller having an input and having outputs connected to both electrical devices, said controller being responsive to first and second input signals for operating both electrical devices together, an electric circuit connecting the power source with the controller input, a first control switch in the circuit actuated and deactuated by applying and releasing the service brake, a second control switch in the circuit in parallel with the first switch actuated and deactuated by movement of the shift lever into and out of PARK position, a first ignition switch in the circuit in series with the first control switch operated between actuated and deactuated positions upon movement of the ignition key between OFF and RUN positions, a second ignition switch in the circuit in series with the second control switch operated between actuated and deactuated positions upon movement of the ignition key between OFF and RUN positions, wherein movement of the shift lever to PARK position and release of the service brake deactuates the first and second control switches and causes the controller to operate the first electrical device to lock the shift lever and to operate the second electrical device to unblock movement of the ignition key to OFF position.

2. The brake-transmission-ignition interlock system of claim 1, wherein movement of the ignition key to RUN position actuates the first ignition switch and applying the brakes actuates the first control switch to provide the first input signal to the controller to operate the first electrical device to unlocking position to enable movement of the shift lever out of PARK position.

3. The brake-transmission-ignition interlock system of claim 2, wherein movement of the ignition key to RUN position also actuates the second ignition switch and subsequent movement of the shift lever out of PARK position actuates the second control switch to provide the second input signal to the controller to maintain the first electrical device in unlocking position.

4. The brake-transmission-ignition interlock system of claim 1, wherein movement of the ignition key to RUN position actuates the first ignition switch and applying the brakes actuates the first control switch to provide the first input signal to the controller to operate the second electrical device to blocking position.

5. A brake-transmission-ignition interlock system for a vehicle having an automatic transmission controlled by a shift lever movable among PARK and a plurality of other operative positions, a service brake, a power source, and an ignition controlled by an ignition key which is movable between OFF, ACCESSORY and RUN positions, comprising a first electrical device movable between positions locking and unlocking the shift lever in PARK position, a second electrical device movable between positions blocking and unblocking movement of the ignition key to OFF position, a controller having an input and having outputs connected to both electrical devices, said controller being responsive to first and second input signals to operate both electrical devices together, an electric circuit connecting the power source with the controller input, a first control switch in a branch of the circuit which is closed and opened by applying and releasing the service brake, a second control switch in the circuit in a parallel branch of the circuit which is opened and closed by movement of the shift lever into and out of PARK position, a first ignition switch in the circuit in series with the first control switch which is opened by movement of the ignition key to OFF position and closed by movement of the ignition key to ACCESSORY and RUN positions, a second ignition switch in the circuit in series with the second control switch which is opened by movement of the ignition key to OFF and ACCESSORY positions and closed by movement of the ignition key to RUN position, wherein closing of either circuit branch provides the first input signal to the controller which operates the first electrical device to unlocking position and operates the second electrical device to blocking position, while opening of both circuit branches provides the second input signal to the controller which operates the first electrical device to locking position and operates the second electrical device to unblocking position, whereby movement of the shift lever to PARK position and release of the service brake opens the first and second control switches to provide the first input signal to the controller.

6. The brake-transmission-ignition interlock system of claim 5, wherein the first and second electrical devices are first and second bi-stable solenoids.

7. The brake-transmission-ignition interlock system of claim 6, wherein movement of the ignition key to RUN position closes the first ignition switch and applying the brakes closes the first control switch to provide the first input signal to the controller to operate the first solenoid to unlocking position.

8. The brake-transmission-ignition interlock system of claim 7, wherein movement of the ignition key to RUN position also closes the second ignition switch and movement of the shift lever out of PARK position closes the second control switch to provide the second input signal to the controller to maintain the first solenoid in unlocking position.

9. The brake-transmission-ignition interlock system of claim 5, wherein movement of the ignition key to RUN position closes the first ignition switch and closing of the first control switch provides the first input signal to the controller to operate the second solenoid to blocking position.

10. The brake-transmission-ignition interlock system of claim 9, wherein movement of the ignition key from RUN position to ACCESSORY position while the shift lever is out of PARK position opens the first ignition switch, but maintains the second ignition switch closed to maintain the first input signal to the controller.

11. A brake-transmission-ignition interlock system for a vehicle having an automatic transmission controlled by a shift lever movable among PARK and a plurality of other operative positions, a service brake, a power source, and an ignition controlled by an ignition key which is movable between OFF, ACCESSORY and RUN positions, comprising a first bi-stable solenoid movable between positions locking and unlocking the shift lever in PARK position, a second bi-stable solenoid movable between positions blocking and unblocking movement of the ignition key to OFF position, a controller having an input and having outputs connected to both solenoids, said controller being responsive to high and low input signals for operating both solenoids together, an electric circuit connecting the power source with the controller input, a first control switch in the circuit closed and opened by applying and releasing the service brake, a second control switch in the circuit in parallel with the first switch opened and closed by movement of the shift lever into and out of PARK position, a first ignition switch in the circuit in series with the first control switch that is opened by movement of the ignition key to OFF position and is closed by movement of the ignition key to ACCESSORY and RUN positions, a second ignition switch in the circuit in series with the second control switch that is opened by movement of the ignition key to OFF and ACCESSORY positions and is closed by movement of the ignition key to RUN position, wherein closing of either circuit branch provides a high input signal to the controller which operates the first solenoid to unlocking position and operates the second solenoid to blocking position, while opening of both circuit branches provides a low input signal to the controller which operates the first solenoid to locking position and operates the second solenoid to unblocking position, whereby movement of the shift lever to PARK position and release of the service brake opens the first and second control switches to provide a low input signal to the controller, and movement of the ignition key to RUN position closes the first ignition switch and applying the service brake closes the first control switch to provide a high input signal to the controller.

12. The brake-transmission-ignition interlock system of claim 11, wherein movement of the ignition key to RUN position also closes the second ignition switch and subsequent movement of the shift lever out of PARK position closes the second control switch to provide a high input signal to the controller.

13. The brake-transmission-ignition interlock system of claim 12, wherein movement of the ignition key from RUN to ACCESSORY position while the shift lever is out of PARK position opens the first ignition switch, but maintains the second ignition switch closed to maintain the high input signal to the controller.

* * * * *